United States Patent Office 3,700,669
Patented Oct. 24, 1972

3,700,669
SEPARATION AND PURIFICATION PROCESS FOR LACTAMS
Shigeru Wakamatsu, Nagoya, Ryozo Kondo, Anjoshi, Aichi, and Masayasu Shinomiya, Nagoya, Japan, assignors to Toray Industries, Inc., Tokyo, Japan
No Drawing. Filed Oct. 31, 1968, Ser. No. 772,369
Claims priority, application Japan, Oct. 31, 1967, 42/69,788
Int. Cl. C07d 41/06
U.S. Cl. 260—239.3  9 Claims

ABSTRACT OF THE DISCLOSURE

By extracting a lactam-containing reaction mixture obtained from the Beckmann rearrangement reaction of a cyclic ketoxime in the presence of water with liquid sulfur dioxide, the lactam can be effectively separated in the pure state.

BACKGROUND OF THE INVENTION

Field of the invention

The present invention relates to a process for separating a high quality lactam in the pure state from a crude lactam obtained by the Beckmann rearrangement of a cyclic ketoxime, or a hydrochloride thereof.

Description of the prior art

It is well known to prepare a crude lactam by the Beckmann rearrangement of a cyclic ketoxime using either sulfuric acid or phosphoric acid as the rearrangement catalyst. To separate and purify the resultant lactam from the crude lactam, there have been proposed various methods. For instance:

(1) The lactam is directly separated from the reaction product mixture of the Beckmann rearrangement, (2) The mixture obtained by the Beckmann rearrangement (using phosphoric acid as the catalyst) is diluted with water and the lactam is then extracted with a chlorinated hydrocarbon, and (3) The mixture obtained by the Beckmann rearrangement (using sulfuric acid or phosphoric acid as the catalyst) is diluted with water, and the lactam is extracted from the diluted mixture by an organic acid compound having a dissociation degree of from $10^{-2}$ to $10^{-15}$, such as phenol.

However, such conventional methods are not satisfactory for industrial practice. That is, in method (1), the formation of inorganic salts as side products may be avoided, but the separation of the lactam must be conducted at a high temperature, whereby the lactam is decomposed and this reduces the lactam yield. In method (2), the lactam extraction rate by the chlorinated hydrocarbon is low, and therefore a large quantity of the chlorinated hydrocarbon is required to extract an efficient amount of lactam. Moreover, in method (3), although the extraction rate may be high, the sulfuric acid or the phosphoric acid is transferred into the extracted lactam, and the organic acid compound used as the extracting agent has a high boiling point (which makes the recovery of the solvent from the lactam difficult). Thus, method (3) will have a deleterious influence on the quality of the lactam.

SUMMARY OF THE INVENTION

It has been found that liquid sulfur dioxide is an excellent lactam separatory reagent, and enabled the production of a high quality lactam by extracting it from a crude lactam reaction product. The process basically comprises separating a pure lactam from a lactam-containing reaction mixture which comprises diluting the lactam-containing reaction product with water, and then extracting the lactam from the diluted reaction mixture with liquid sulfur dioxide without removal of the acid catalyst. The lactam-containing reaction mixture is one which has been obtained by the Beckmann rearrangement reaction in the presence of a sulfuric or phosphoric acid catalyst of a compound selected from the group consisting of a cyclic ketoxime and a hydrochloride thereof.

Typically, the proportion of water utilized is greater than 1 mole of water per mole of the lactam which is contained in the reaction product. The Beckmann rearrangement will generally be conducted in the presence of sulfuric acid or phosphoric acid as a catalyst. Since the sulfur dioxide must be liquid, the extraction is preferably conducted at a temperature within the range of from about $-40°$ C. to about $60°$ C. If a temperature higher than $10°$ C. is utilized, the reaction must generally be conducted under pressure. However, if a temperature lower than $10°$ C. is utilized, the extraction may be conducted at normal atmospheric pressures.

Therefore, an object of the present invention is to provide a process for profitably separating a high quality pure lactam, on an industrial scale, from a crude lactam containing an acid catalyst obtained by the aforesaid Beckmann rearrangement, without being accompanied by the faults of the prior art.

DESCRIPTION OF THE PREFERRED EMBODIMENTS

The inventors have found that liquid sulfur dioxide is an excellent lactam separatory reagent, and have succeeded in producing a high quality lactam by extracting the crude lactam in the presence of the acid catalyst with liquid sulfur dioxide.

According to the process of this invention, a lactam-containing reaction product obtained by subjecting a cyclic ketoxime or a hydrochloride thereof to a Beckmann rearrangement reaction with sulfuric acid or phosphoric acid is diluted with water and then the lactam is extracted from the diluted reaction mixture by liquid sulfur dioxide.

In the process of this invention, water is added to the reaction product of the Beckmann rearrangement to loosen the bond between the lactam and the acid, and also to improve the extraction efficiency of the lactam by liquid sulfur dioxide. Furthermore, when an extraction with liquid sulfur dioxide is attempted without adding water to the Beckmann rearrangement reaction product containing the sulfuric acid or phosphorus acid catalyst nothing is extracted. Accordingly, it is necessary that the proportion of water to be added to the reaction product be larger than 1 mole per 1 mole of the lactam in the Beckmann rearrangement reaction product which typically contains 1.5–3.0 moles of sulfuric acid or phosphoric acid per 1 mole of the lactam. If the proportion of water is less than 1 mole, the extraction rate of the lactam is essentially non-existent. The extraction ratio is higher as the amount of water increases, but since it is preferable to recover the acid materials contained in the aqueous layer for reuse after extraction, the amount of water is preferably controlled to be present in a ratio less than 100 moles, most preferably less than 80 moles per mole of lactam.

The relationship between the amount of water and the extraction ratio of the lactam is illustrated by the following text. That is, when one part by weight of a Beckmann rearrangement reaction product containing 1 mole of ε-caprolactam and 2 moles of sulfuric acid was extracted once by 3.3 parts by weight of liquid sulfur dioxide at room temperature, the relation of the amount of water added and the extraction ratio of the lactam could be shown by the following table.

Water/$\epsilon$-caprolactam
(mole ratio): Extraction ratio (percent)

| | |
|---|---|
| 0 | 0.0 |
| 1 | 2.0 |
| 5 | 10.0 |
| 20 | 31.5 |
| 50 | 65.0 |
| 80 | 80.0 |
| 100 | 80.5 |
| 110 | 81.0 |

When liquid sulfur dioxide is added to the reaction product diluted with water, a part of the liquid sulfur dioxide will be dissolved in the aqueous solution containing the reaction product. However, when the proportion of the liquid sulfur dioxide added becomes excessive, the system will separate into an aqueous solution phase and a liquid sulfur dioxide phase. Therefore, in order to extract the lactam contained in the reaction product, liquid sulfur dioxide must be added to such an extent that the system will be separated into an aqueous phase and a liquid sulfur dioxide phase. The amount of liquid sulfur dioxide required to do this depends on the type and concentration of the component in the aforesaid aqueous solution, the extraction temperature and pressure, etc., but the suitable amount of liquid sulfur dioxide can be easily determined by a simple test. By conducting the extraction with a suitable amount of liquid sulfur dioxide, the lactam in the aqueous reaction product solution can be easily extracted into the liquid sulfur dioxide. The dioxide is preferably used in an amount of from about one to about ten times the amount of lactam, by weight. Of course, in view of the above discussion, it will be appreciated by one skilled in the art that process conditions may require variation from this range, depending upon the exact requirements of the product lactam.

The extraction temperature may be varied in a wide range in the process of this invention, but is preferably from $-40°$ C. to $60°$ C. Sulfur dioxide is a compound having a boiling point of $-10°$ C., but it is easily liquefied by compressing it. Therefore, when conducting the extraction at a temperature higher than $-10°$ C., the extraction is carried out under pressure. For example, the reaction between the extraction temperature and pressure is shown in the following table.

| Temperature (° C.) | Gauge pressure | Absolute pressure (atm.) |
|---|---|---|
| −10 | 0 | 1 |
| 0 | 1.5 | 2.5 |
| 20 | 3.0 | 4.0 |
| 60 | 11 | 12 |

The lactam in the extracting reagent can be easily recovered therefrom in a highly pure state by merely evaporating the sulfur dioxide, but in order to obtain lactam having a higher quality, it is preferable that, after washing with water, the sulfur dioxide be evaporated off, or else after evaporating the sulfur dioxide that the acid carried by the lactam be neutralized, for example by aqueous ammonia.

After recovering the sulfur dioxide dissolved in the extraction residue by a suitable method, the sulfuric acid or phosphoric acid solution which is left is concentrated or, if necessary, purified for reuse as the rearrangement catalyst.

The process of this invention may be carried out in a batch system or a continuous system, or may be conducted by a combination of both systems. However, considered from an economical viewpoint, it is effective to conduct the process in a continuous countercurrent extraction system.

The process of this invention can be applied to the separation and purification of a lactam which is not precipitated during the dilution of the lactam-containing reaction product with water or during the extraction thereof with liquid sulfur dioxide. In general, since a lactam having a large carbon number, such as $\lambda$-laurinlactam, has a low solubility in water, the lactam contained in the reaction product is precipitated when the reaction product is diluted with water, which makes the extraction of the lactam by liquid sulfur dioxide difficult. In particular, the process of this invention is most suitably applied to separate $\eta$-caprylactam and $\epsilon$-caprolactam.

The present invention offers the following advantages:

(1) Since the system is not neutralized with an alkali, the lactam can be easily recovered without forming by-product inorganic salts, and the rearrangement catalyst can be recovered for reuse.

(2) Since only the lactam can be selectively extracted from the reaction product by liquid sulfur dioxide and the sulfur dioxide can also be easily separated from the lactam in view of the low boiling point of the sulfur dioxide, the lactam can be obtained at a high quality. Moreover, the sulfur dioxide thus separated can be used again as it is.

(3) The extraction efficiency of the lactam is very high, and the content of the rearrangement catalyst contained in the extracted lactam is very low as compared to conventional methods.

(4) Sulfur dioxide is inexpensive when compared with chlorinated hydrocarbons or phenols.

The invention will now be explained with reference to the following examples and comparative examples, in which the permanganate value is a relative value of the amount of reducing impurities contained in the lactam. The larger that this value is, the higher the purity. The permanganate value is determined as follows:

One gram of the lactam to be tested is accurately weighed out and dissolved in a measuring cell with 100 ml. of distilled water. To this solution is added 1 ml. of 0.01 N-KMnO$_4$ solution, and the resultant material is placed beside a comparison sample. The decloration of the sample is now absorbed and, at the exact point of equality of color with the comparison sample (3 grams $$CoCl_2 \cdot 6H_2O$$

2 grams $CuSO_4 \cdot 5H_2O$ in 1 liter of water), the time is taken with a stop watch. This time, in seconds, is the PMV (permanganate value).

EXAMPLE 1

In a Beckmann rearrangement flask there was preliminarily charged 20 g. of 100% sulfuric acid and thereafter, while adding dropwise 30 g. (0.27 mole) of cyclohexanone oxime and 30 g. of 100% sulfuric acid separately, the rearrangement was conducted at 105–110° C., with stirring. After the rearrangement was finished, the reaction product was cooled to room temperature and poured in a pressure-resisting glass extractor together with 100 ml. (5.6 moles) of water. Thereafter, the lactam was extracted four times using 100 ml. of liquid sulfur dioxide at room temperature under pressure.

By evaporating off the sulfur dioxide from the sulfur dioxide phase thus separated at room temperature, 29.4 g. of $\epsilon$-caprolactam was obtained with a yield of 98.0%. After adding 0.4 g. of sodium hydroxide to the $\epsilon$-caprolactam obtained, the mixture was subjected to a vacuum distillation to provide 28.8 g. of an $\epsilon$-caprolactam fraction (colorless) having a boiling point of 116–117° C./5 mm. Hg. The yield thereof from cyclohexanone oxime was 96.0%. A quality test of the product showed that the content of volatile bases was 4 p.p.m., and the permanganate value was 3600 seconds.

On the other hand, when the Beckmann rearrangement reaction product obtained as above was neutralized with ammonia and, after adding 0.4 g. of sodium hydroxide to the upper layer of a crude lactam oil thus formed, the mixture was subjected to a vacuum distillation, 29.0 g. of an ε-caprolactam fraction was obtained. The ε-caprolactam contained 30 p.p.m. of volatile bases, and the permanganate value thereof was 450 seconds.

From the above results, it can be seen that the process of the present invention yields an excellent quality of ε-caprolactam, when compared with a conventional method in which sulfuric acid is removed as ammonium sulfate.

EXAMPLE 5

The same rearrangement as in Example 1 was conducted using 50 g. of cyclooctanone oxime hydrochloride (68.2% as oxime) and 47.0 g. of 100% sulfuric acid. In this case, hydrogen chloride gas was released from the system. The reaction product was cooled to −15° C. and diluted with 100 ml. of water as in Example 1. To the product there was added 100 ml. of liquid sulfur dioxide cooled to −15° C., and thereafter the extraction of the lactam was conducted four times at the same temperature. By evaporating off the sulfur dioxide from the extract at room temperature, 33.18 g. of η-caprolactam was obtained with a yield of 97.1%. Thus, it will be understood that the extraction can be conducted easily at normal pressure when it is conducted at a temperature lower than −10° C.

COMPARATIVE EXAMPLE 1

To 25 g. of ε-caprolactam were added 40 g. of 100% sulfuric acid and 65 g. of water. After adding to the mixture 100 ml. of each of the extracting reagents, the extraction was conducted four times at 25° C. Furthermore, the same procedure was repeated, while employing phosphoric acid instead of sulfuric acid.

The extraction rates of ε-caprolactam by each extracting reagent, and the weight ratios of sulfuric acid or phosphoric acid present in the ε-caprolactam to the ε-caprolactam are shown in the following table.

TABLE 1

| Catalyst | Extracting reagent | Extraction rate (percent) | Weight ratio |
|---|---|---|---|
| Sulfuric acid | Liquid SO$_2$ | 99.1 | 0.08 |
| Do | Phenol | 99.3 | 0.76 |
| Do | CHCl$_3$ | 36.1 | 0.05 |
| Phosphoric acid | Liquid SO$_2$ | 99.6 | 0.09 |
| Do | Phenol | 99.8 | 0.68 |
| Do | CHCl$_3$ | 76.8 | 0.06 |

It is clear from the above results that liquid sulfur dioxide is excellent as an extracting reagent for ε-caprolactam.

COMPARATIVE EXAMPLE 2

After conducting the Beckmann rearrangement reaction as in Example 1, the reaction product was cooled, mixed with 100 g. of water, and the mixtures was divided into three equal parts. To each of the divided parts was added 40 g. of each of the three kinds of the extracting reagents shown in Comparative Example 1, and the extraction was conducted four times at 25° C. in a pressure-resistant extractor.

By evaporating the extracting reagent at room temperature when liquid sulfur dioxide was employed; evaporating it at 62° C. under normal pressure when chloroform was employed; and evaporating it under reduced pressure at 151° C./20 mm. Hg when phenol was employed, pure ε-caprolactam was obtained. The extraction rates of ε-caprolactam, the contents of volatile bases and the permanganate values for this example are shown in the following table.

TABLE 2

| Extracting reagent | Extraction rate (percent) | Volatile base (p.p.m.) | Permanganate value (sec.) |
|---|---|---|---|
| SO$_2$ | 98.1 | 18 | 2,100 |
| CHCl$_3$ | 97.9 | 25 | 500 |
| Phenol | 89.5 | 20 | 20 |

From the above results, it will be understood that liquid sulfur dioxide shows a very high effect in removing the reducing materials. The fact that the permanganate value was small when using phenol is caused by difficulty in separating the phenol.

What is claimed is:

1. A process for the separation of a pure lactam from a lactam-containing reaction mixture which comprises: diluting with water the lactam-containing reaction product obtained by the Beckmann rearrangement reaction of a compound selected from the group consisting of a cyclic ketoxime and a hydrochloride thereof, in the presence of a catalyst selected from the group consisting of sulfuric acid and phosphoric acid, the amount of water being greater than 1 mole per mole of the lactam contained in the reaction product, and extracting the lactam from the diluted reaction mixture with liquid sulfur dioxide.

2. The process as claimed in claim 1 wherein said lactam is ε-caprylactam.

3. The process as claimed in claim 1 wherein said lactam is ε-caprolactam.

4. The process as claimed in claim 1 wherein the amount of said water is from about 1 to about 100 moles per mole of the lactam.

5. The process of claim 1 wherein said sulfur dioxide is utilized in an amount of from about 1 to about 10 times the amount of lactam by weight.

6. The process as claimed in claim 1 wherein said extraction is conducted at a temperature of from about −40° C. to about 60° C.

7. The process as claimed in claim 6 wherein said extraction is conducted at a temperature higher than −10° C. under pressure.

8. The process as claimed in claim 6 wherein said extraction is conducted at a temperature lower than −10° C. at normal pressure.

9. The process as claimed in claim 4, wherein the amount of said water is from about 20–100 moles per mole of the lactam.

References Cited

UNITED STATES PATENTS

| 2,313,026 | 3/1943 | Schlack | 260—239.3 |
| 2,351,381 | 6/1944 | Wiest | 260—239.3 |
| 2,744,107 | 5/1956 | Welz | 260—239.3 |
| 3,347,852 | 10/1967 | Ishikawa et al. | 260—239.3 |
| 3,016,375 | 1/1962 | Hopkins et al. | 260—239.3 |
| 3,427,303 | 2/1969 | Genas et al. | 260—239.3 |
| 3,431,255 | 3/1969 | Strauss et al. | 260—239.3 |
| 3,462,417 | 8/1969 | Simmrock et al. | 260—239.3 |

OTHER REFERENCES

Audrieth et al.: "Non Aqueous-Solvents" pp. 210–215 (Wiley) (1953).

HENRY R. JILES, Primary Examiner

R. T. BOND, Assistant Examiner